US010211715B2

(12) United States Patent
Liu

(10) Patent No.: US 10,211,715 B2
(45) Date of Patent: Feb. 19, 2019

(54) SELF-POWERED WIRELESS SWITCH

(71) Applicant: Yuan Fang Liu, Shenzhen (CN)

(72) Inventor: Yuan Fang Liu, Shenzhen (CN)

( * ) Notice: Subject to any disclaimer, the term of this patent is extended or adjusted under 35 U.S.C. 154(b) by 492 days.

(21) Appl. No.: 14/914,254

(22) PCT Filed: Aug. 7, 2014

(86) PCT No.: PCT/CN2014/083858
§ 371 (c)(1),
(2) Date: Feb. 24, 2016

(87) PCT Pub. No.: WO2015/027803
PCT Pub. Date: Mar. 5, 2015

(65) Prior Publication Data
US 2016/0204686 A1 Jul. 14, 2016

(30) Foreign Application Priority Data

Aug. 26, 2013 (CN) .......................... 2013 1 0392707
Mar. 24, 2014 (CN) .......................... 2014 1 0111960
Apr. 25, 2014 (CN) ..................... 2014 2 0209274 U

(51) Int. Cl.
*H01H 23/00* (2006.01)
*H02K 35/02* (2006.01)
(Continued)

(52) U.S. Cl.
CPC ........... *H02K 35/02* (2013.01); *H02K 7/1876* (2013.01); *H01H 9/168* (2013.01); *H01H 23/143* (2013.01);
(Continued)

(58) Field of Classification Search
CPC ........ H02K 35/00; H02K 35/02; H02K 33/18; H02K 7/1876; H01H 2239/076; H01H 9/168; H01H 2300/03; H01H 23/143
(Continued)

(56) References Cited

U.S. PATENT DOCUMENTS 4,471,353 A * 9/1984 Cernik .................... G08C 23/04
331/155
7,019,241 B2 * 3/2006 Grassl ................. H01L 41/1136
200/339
(Continued)

FOREIGN PATENT DOCUMENTS

DE 10112072 B4 * 9/2001 ............... H04Q 9/00
DE 102011002740 A1 * 7/2012 ........... H02K 7/1876
WO WO 2013159247 A1 * 10/2013 ............. H02K 35/00

*Primary Examiner* — Burton S Mullins
(74) *Attorney, Agent, or Firm* — Raymond Y. Chan; David and Raymond Patent Firm

(57) ABSTRACT

A self-powered wireless switch includes at least one micro generator and a control panel for transmitting wireless control signals, the micro generator including a magnet assembly and a coil assembly being moved relatively to one another to generate an induced current within the coil assembly; the coil assembly including an iron core and a wire winding around the outside of the iron core to form a magnetic coil; the magnet assembly including a permanent magnet and magnet conductive plates arranged at two sides of the opposite magnetic poles of the permanent magnet. The self-powered wireless switch enables the magnetic assembly and the coil assembly to move relatively to one another and converts the mechanical energy to electricity, thereby achieving self-power generation and providing electricity to the control panel for transmission of wireless control signals.

6 Claims, 10 Drawing Sheets

(51) Int. Cl.
*H02K 7/18* (2006.01)
*H01H 9/16* (2006.01)
*H01H 23/14* (2006.01)

(52) U.S. Cl.
CPC ... *H01H 2239/076* (2013.01); *H01H 2300/03* (2013.01); *Y02B 70/3241* (2013.01); *Y02B 90/224* (2013.01); *Y04S 20/14* (2013.01); *Y04S 20/227* (2013.01)

(58) Field of Classification Search
USPC .......................................................... 310/36
See application file for complete search history.

(56) References Cited

U.S. PATENT DOCUMENTS

| | | | | |
|---|---|---|---|---|
| 8,148,856 B2* | 4/2012 | Bataille | .................. | H02K 35/02 |
| | | | | 290/1 R |
| 8,592,703 B2* | 11/2013 | Johnson | .................. | H01H 23/02 |
| | | | | 200/339 |
| 2012/0062049 A1* | 3/2012 | Baur | ...................... | H02K 35/02 |
| | | | | 310/28 |
| 2014/0285296 A1* | 9/2014 | Nagahara | ............... | H02K 35/02 |
| | | | | 335/302 |
| 2015/0279598 A1* | 10/2015 | Matsumoto | .......... | H02K 7/1853 |
| | | | | 335/205 |

* cited by examiner

SELF-POWERED WIRELESS SWITCH

CROSS REFERENCE OF RELATED APPLICATION

This is a non-provisional application that claims priority to an international application number PCT/CN2014/083858, international filing date Aug. 7, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a wireless switch, and more particular to a self-power wireless switch.

Description of Related Arts

With the advent of high technology, the electronic industry has experienced very significant growth that that wireless controllers are commonly utilized in different electronic controlling device. Even though such wireless controllers bring us convenience, thousands of old wireless controllers will pollute our environment and waste our resources.

Firstly, the wireless controller must be powered by batteries as a power source. Therefore, the user must frequently replace the old batteries with new batteries after a period of time usage. The operating cost for the wireless controller will be significantly increased by the batteries. Since most of the batteries are disposable, the old batteries will pollute our environment. Accordingly, land pollution is aggravated because of the wasted electronic components, such that many countries issue strict environmental regulations for those electronic wastes.

Accordingly, most indoor illuminating devices generally comprise a wall controlling switch electrically connected to an illuminator via an electrical wire for controlling the illuminator in an on-and-off manner. In particular, the wiring configuration must be pre-designed in a floor plan of the building to illustrate the exact location of the controlling switch to run the electrical wire from the illuminator to the controlling switch. In addition, a switch box, PVC wire sleeve, and electric wires must be embedded into the wall by pre-forming a wire running groove in the wall. The installation not only takes times but also wastes lots of different materials. More importantly, it is impossible to re-locate the controlling switch. Otherwise, the wall must be damaged to form another wire running groove for the new electrical wire. Safety concerns are other issues that the switch box and the PVC wire sleeve must provide moisture prevention and explosion protection.

In order to solve the above problems, the indoor illuminating device incorporates with a wireless switch wirelessly connected to the illuminator for controlling the illuminator in an on-and-off manner. However, the existing wireless switch has several drawbacks. (1) The users are not used to recharge the wireless switch via an external power outlet, such as a wall outlet, for operating the illuminator. (2) It is a hassle to find the wireless switch as it is considered as a portable device to be stored at any location of the building. (3) When the wireless switch is designed to be affixed on the wall structure, the wireless switch must be powered by batteries. Therefore, the user must replace the batteries frequently after a period of time. In particular, the user must detach the wireless switch from the wall and disassemble the outer casing of the wireless switch for cleaning and replacing the batteries. Otherwise, the battery acid will leak out of the battery to pollute the environment and to shorten the service life span of the battery. As result, the wireless switch cannot be widely used due to the above drawbacks.

SUMMARY OF THE PRESENT INVENTION

The invention is advantageous in that it provides a self-powered wireless switch which is reliable, safe, and convenient with a remote switch, and can be widely used in everyday life.

Additional advantages and features of the invention will become apparent from the description which follows, and may be realized by means of the instrumentalities and combinations particular point out in the appended claims.

According to the present invention, the foregoing and other objects and advantages are attained by a self-powered wireless switch, comprising: at least a micro generator and a control panel operatively linked to the micro generator for generating a wireless control signal to an electronic device. The micro generator comprises a magnet assembly and a coil assembly being moved in relation to each other to generate an induced current by the coil assembly. The coil assembly comprises a coil core and a coil wire wound around the coil core to form a magnetic coil. The magnet assembly is arranged at one side of the coil assembly to align with the centerline of the coil assembly. The magnet assembly comprises a permanent magnet and two magnet conductive panels provided at two sides of the opposite magnetic poles of the permanent magnet respectively.

Accordingly, the self-powered wireless switch further comprises a supporting panel, wherein the micro generator is supported by the supporting panel. Two sliding panels are symmetrically and spacedly extended from the supporting panel, wherein each of the sliding panels has a sliding groove formed thereat. Two sides of the magnet assembly are engaged with the sliding grooves of the sliding panels in a slidably movable manner.

Preferably, one end of the coil core is extended out of the coil wire to define a protrusion portion, wherein the extension portion of the coil core is contacted with the magnet conductive panels.

Accordingly, two extension portions of the magnet conductive panels are extended out of the permanent magnet to define a magnetic cavity between the extension portions. The protrusion portion of the coil core is disposed within the magnetic cavity, wherein when the magnetic assembly is moved up-and-down, the protrusion portion of the coil core can be moved within the magnetic cavity to contact with inner sides of the extension portions of the magnet conductive panels in an alternating manner.

Accordingly, the magnet assembly further comprises an outer supportive frame having an interior cavity, wherein the permanent magnet and the magnet conductive panels are supported within the interior cavity of the outer supportive frame. The outer supportive frame further has two sliding members extended from two sides thereof to slidably engage with the sliding grooves of the sliding panels respectively.

Accordingly, the supporting panel further has a protruded signal generator wherein a mid-portion of the switch panel is pivotally coupled at the protruded platform of the supporting panel, so as to pivotally couple the switch panel on the supporting panel. The magnet assembly is coupled at one end of the switch panel and the coil assembly is affixed at the supporting panel.

Accordingly, the switch panel further has two engaging arms extended from two sides thereof and two engaging clips integrally formed at two free ends of the engaging arms respectively. The engaging clips are detachably engaged with the outer supportive frame.

Accordingly, the switch panel has a panel cavity formed at a bottom side thereof, wherein the magnet assembly is coupled at the inner wall of the panel cavity of the switch panel.

Accordingly, a resilient element has one end coupled at the supporting panel and another end coupled at the coil core.

Accordingly, the coil core, having a W-shape, comprises a mid core arm and two side core arms, wherein the mid core arm is spacedly located between the two side core arms. The resilient element, having a U-shape, is overlapped on the coil core. The resilient arms of the resilient element are longer than the side core arms of the coil core. The resilient arms of the resilient element are coupled at the supporting panel.

The coil core has a mid core body where the wire coil are wound therearound, a first core arm, and a second core arm, wherein the first and second core arms are oppositely and alignedly extended from the mid core body. The first core arm is pivotally coupled at the supporting panel to enable the rotation of the coil core. The second core arm is extended within the magnetic cavity. The magnet assembly is affixed on the supporting panel.

The self-powered wireless switch further comprises an outer frame formed in a ring shape to couple at the peripheral portions of the supporting panel and the switch panels.

Accordingly, three micro generators are supported at upper and lower portions of the supporting panel in an alternating manner, wherein three switch panels are coupled to the micro generators respectively and are orderly coupled at the supporting panel side-by-side.

Comparing to the existing switch, the present invention provides the self-powered wireless switch to generate an induced current by an actuation of the switch panel to create a movement between the magnet assembly and the coil assembly. Therefore, the self-powered wireless switch can convert the mechanical energy from the switch panel to the electrical energy by the micro generator as a power supply for the control panel to transmit the wireless control signal. The present invention is reliable, safe, and convenient with a remote switch. The present invention is a battery-less self-powered unit, such that the present invention does not require any battery replacement to minimize the pollution from the battery. The present invention does not require any wall wiring structure or wire protective sleeve to minimize the material cost related to the installation. The time for installation of the present invention can be significantly shortened to reduce the installation cost thereof. The operation of the present invention is the same as that of the conventional wire type switch via the switch panel. The present invention can be widely used in everyday life.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
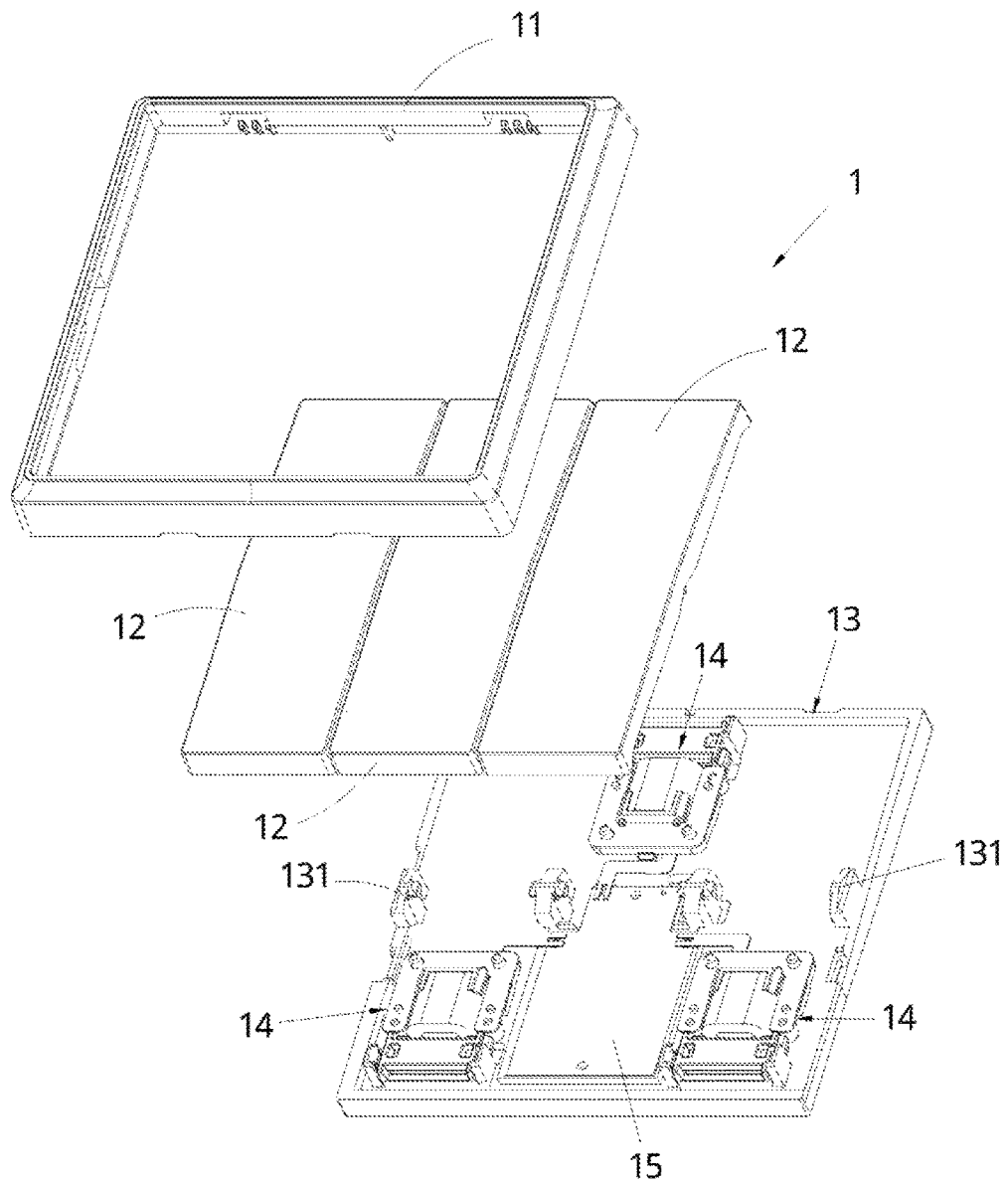
FIG. 1 is an exploded perspective view of a self-powered wireless switch according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 11 of the drawings, a self-powered wireless switch 1 according to a preferred embodiment of the present invention is illustrated, wherein the self-powered wireless switch 1 is adapted to incorporate with any electronic device. In particular, the self-powered wireless switch 1 is a self-powered unit for controlling the electronic device in an on-and-off manner. For example, the self-powered wireless switch 1 according to the preferred embodiment is arranged to control an illuminator in an on-and-off manner. It is appreciated that the self-powered wireless switch 1 can switch on and off other electronic devices such as television, refrigerator, and electric fan.

As shown in FIGS. 1 to 4, the self-powered wireless switch 1 comprises a supporting panel 13 serving as a base panel, at least a micro generator 14 supported on the supporting panel 13, a control panel 15, and a switch panel 12. The control panel 15 is a signal transmitter for transmitting a wireless control signal. In other words, when the control panel 15 is activated, the control panel 15 will generate and transmit the wireless control signal to the electronic device in order to control the electronic device, such as switch on the electronic device or switch off the electronic device.

The micro generator 14 comprises a magnet assembly 144 supported in a movable manner and a coil assembly coupled at the supporting panel. The magnet assembly 14 comprises a permanent magnet 1443 and two magnet conductive panels 1442, wherein the magnet conductive panels 1442 are located at two opposite poles (N-S) of the permanent magnet 1443 at two sides thereof respectively. In other words, the magnet conductive panels 1442 are magnetized by the permanent magnet 1443 to form two opposite magnetic poled panels respectively. The coil assembly comprises a coil core 142, such as an iron core, and a coil wire wound around the coil core 142 to form a magnetic coil 147, wherein the coil wire is electrically linked to the control panel 15. According to the Faraday's Law of Induction, when the line of the magnetic force of the coil core 142 is changed to generate an electromotive force, an induced current is generated by the magnetic coil 147 via the coil wire.

Figure 2:
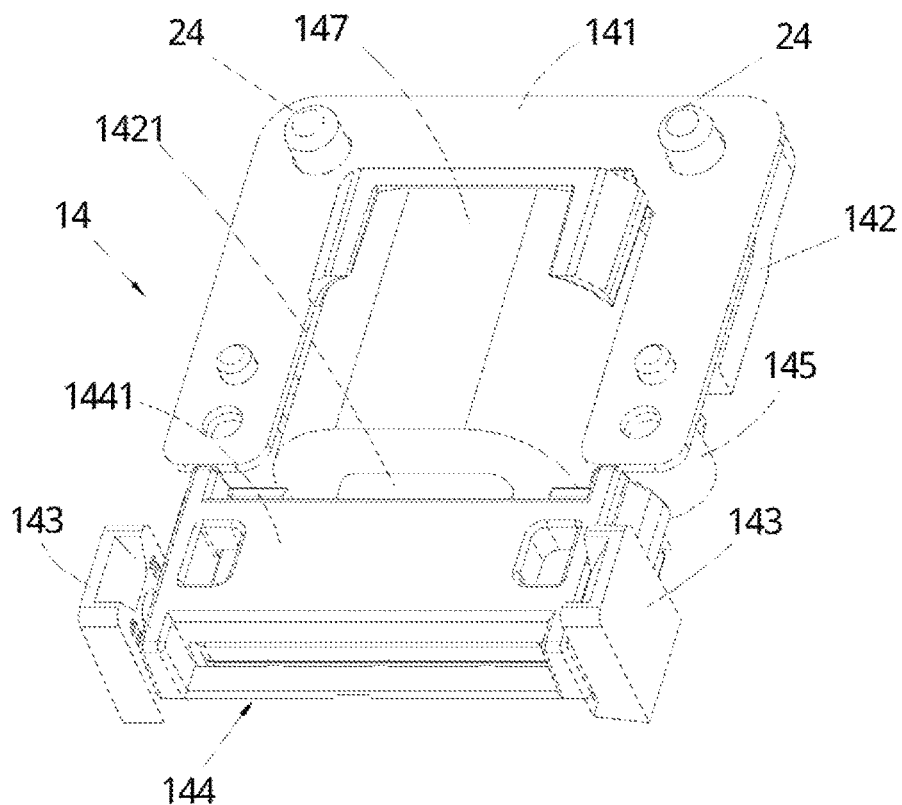
FIG. 2 is a perspective view of a micro generator of the self-powered wireless switch according to the above preferred embodiment of the present invention.
Figure 3:
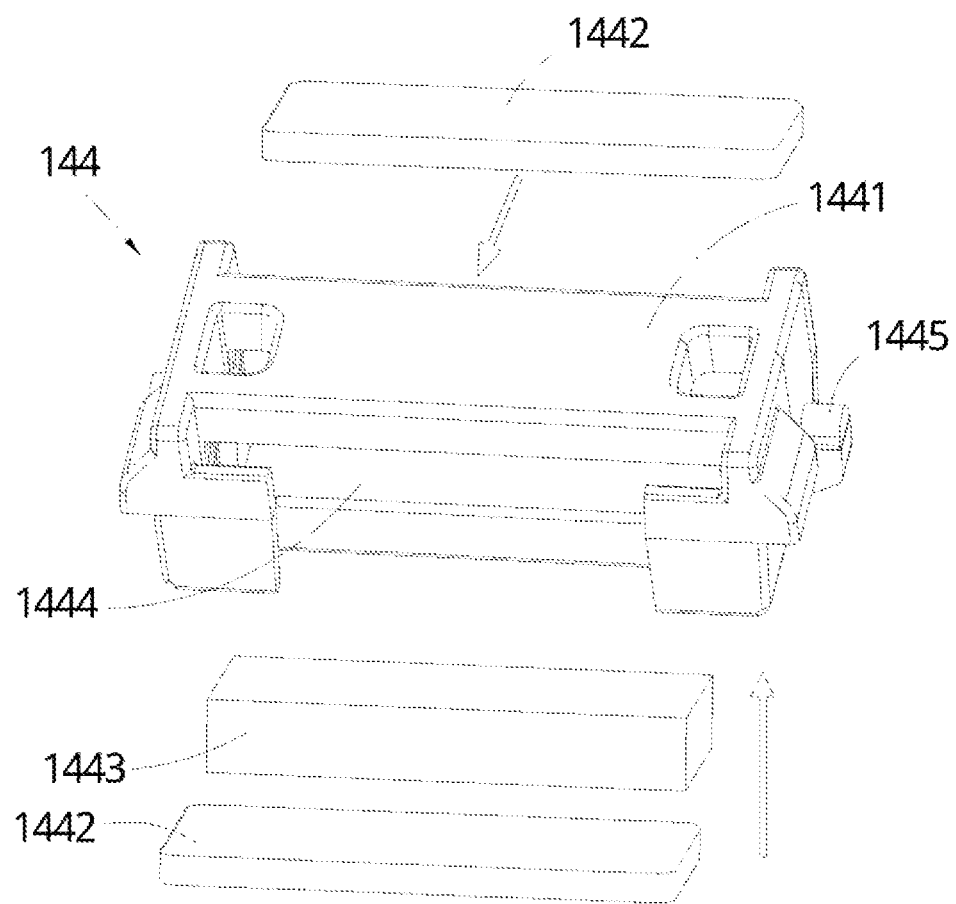
FIG. 3 is an exploded perspective view of a magnet assembly of the self-powered wireless switch according to the above preferred embodiment of the present invention.
Figure 4:
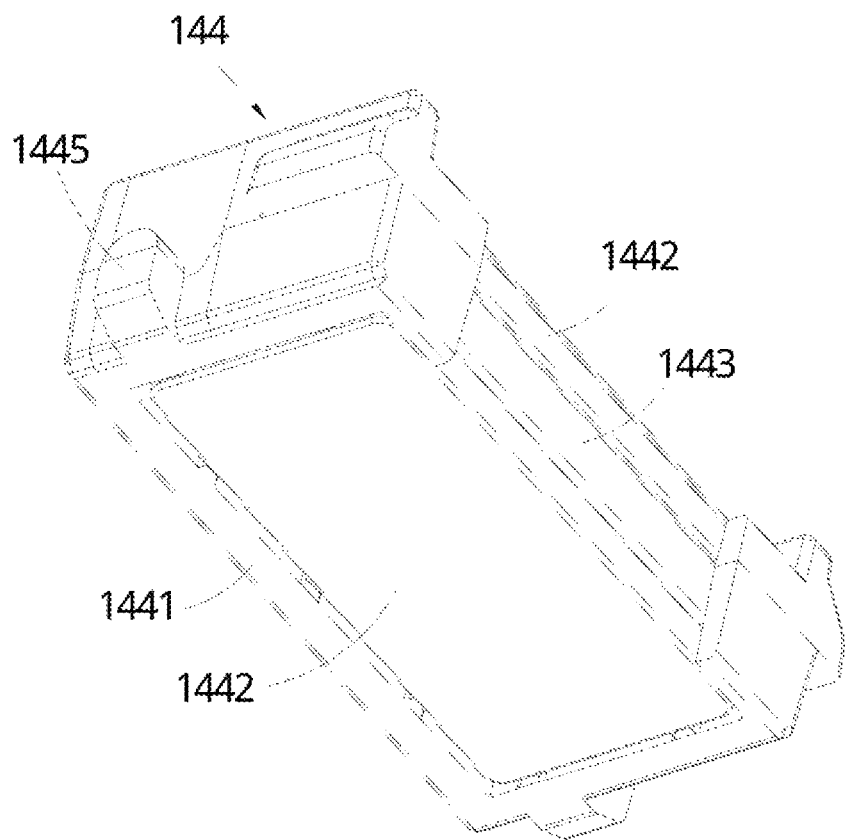
FIG. 4 is a perspective view of the magnet assembly of the self-powered wireless switch according to the above preferred embodiment of the present invention.
Figure 7:
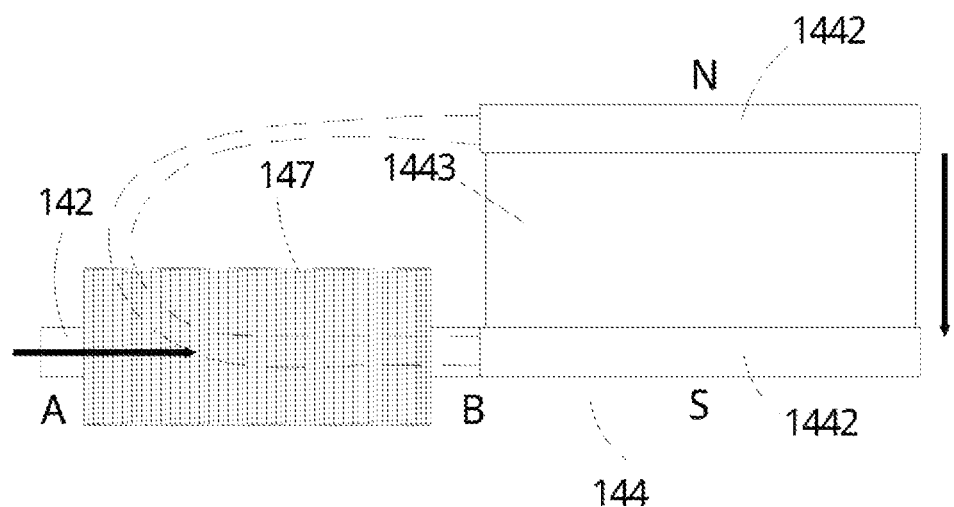
FIG. 7 illustrates the magnet induction between the magnet assembly and the coil assembly when the magnet assembly is moved downward according to the above preferred embodiment of the present invention.
Figure 8:
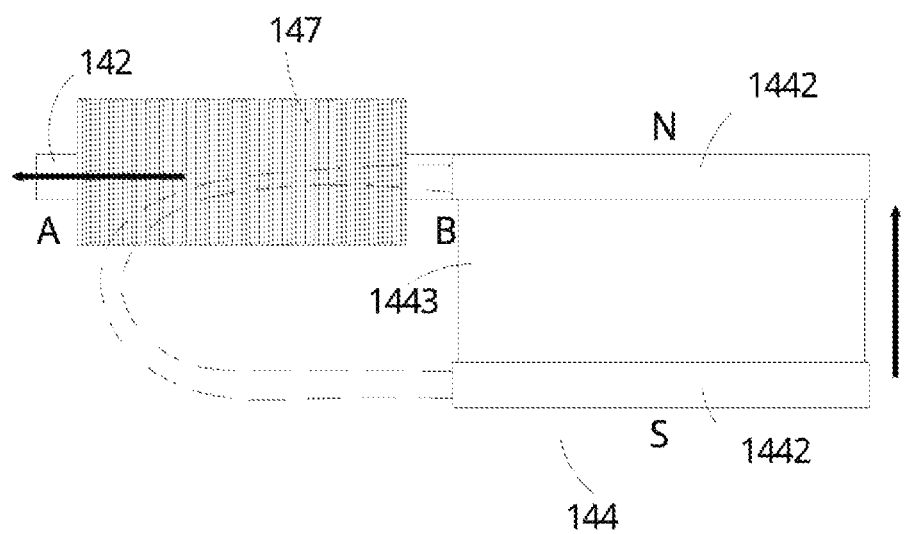
FIG. 8 illustrates the magnet induction between the magnet assembly and the coil assembly when the magnet assembly is moved upward according to the above preferred embodiment of the present invention.

As shown in FIGS. 2, 7, and 8, the magnet assembly 144 is located at a first side (right side) of the coil core 142, wherein a face (left face) of one of the magnet conductive panels 1442 is contacted with a face (right face) of the coil core 142. In particular, the magnet assembly 144 is movable in relation to the coil core 142, such as an up and down sliding movement. The magnet assembly 144 is arranged at one side of the coil assembly facing the centerline of the magnetic coil 147, such that the coil core 142 perpendicularly faces toward the magnet assembly 144. It is worth mentioning that the coil core 142 can faces toward the magnet assembly 144 at any angle in order to magnetically induce with the coil core 142 and to change the line of the magnetic force of the coil core 142 for generating the induced current.

According to the preferred embodiment, the micro generator 14 further comprises two sliding panels 143 symmetrically and spacedly extended from the supporting panel 13 to form a sliding cavity between the sliding panels 143, wherein each of the sliding panels 143 has a sliding groove formed thereat, such that the sliding grooves of the sliding panels 143 face toward each other. Two sides of the magnet assembly 144 are engaged with the sliding grooves of the sliding panels 143 in a slidably movable manner, such that the magnet assembly 144 is movably supported at the sliding cavity. Accordingly, the sliding displacement of the magnet assembly 144 is restricted by the length of the sliding groove, so as to limit the up-and-down sliding movement of the magnet assembly 144. In other words, the magnet assembly 144 is retained by the sliding panels 143 to ensure the coil core 142 to perpendicularly face toward the magnet assembly 144.

Accordingly, the magnet assembly 144 further comprises an outer supportive frame 1441 having an interior cavity 1444, wherein the permanent magnet 1443 and the magnet conductive panels 1442 are supported within the interior cavity 1444 of the outer supportive frame 1441. Therefore, the permanent magnet 1443 can be securely retained between the two magnet conductive panels 1442 to prevent any unwanted movement between the permanent magnet 1443 and each of the magnet conductive panels 1442. The outer supportive frame 1441 further has two sliding members 1445 extended from two sides thereof to slidably engage with the sliding grooves of the sliding panels 143 respectively, such that the magnet assembly 144 can be slid at the sliding grooves of the sliding panels 143 in an up-and-down movable manner.

Figure 5:
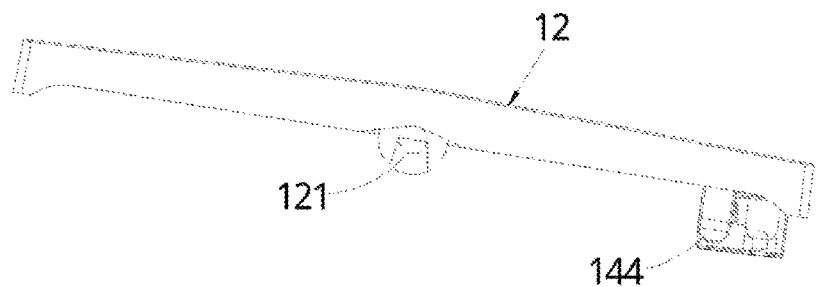
FIG. 5 is a perspective view of the switch panel of the self-powered wireless switch according to the above preferred embodiment of the present invention, illustrating the magnet assembly coupled at the switch panel.
Figure 6:
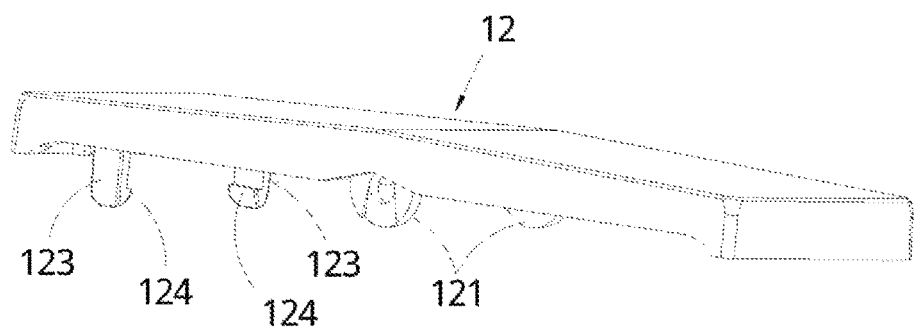
FIG. 6 is a perspective view of the switch panel of the self-powered wireless switch according to the above preferred embodiment of the present invention.

As shown in FIGS. 1, 5, and 6, the supporting panel 13 further has a protruded platform 131, wherein a mid-portion of the switch panel 12 is pivotally coupled at the protruded platform 131 of the supporting panel 13, so as to pivotally couple the switch panel 12 on the supporting panel 13. The switch panel 12 has a panel cavity formed at a bottom side thereof, wherein a pivot arm 121 is extended from the panel cavity of the switch panel 12 at the mid-portion thereof to pivotally couple with the protruded platform 131, such that the switch panel 12 forms a seesaw panel on the supporting panel 13. A first end (right end) of the switch panel 12 is coupled to the magnet assembly 144, wherein when an opposed second end of the switch panel 12 is actuated, the first end thereof is pivotally moved to drive the magnet assembly 144 to reciprocatingly move up-and-down. Therefore, the permanent magnet 1443 and the magnet conductive panels 1442 are moved at the same time, such that the magnet conductive panels 1442 are aligned with the coil core 142 in an alternating manner, as shown in FIGS. 7 and 8. In other words, one of the magnet conductive panels 1442 will align with the coil core 142 when the magnet assembly 144 is moved upward while another magnet conductive panel 1442 will align with the coil core 142 when the magnet assembly 144 is moved downward. Since the magnet conductive panels 1442 have two opposite poles respectively, i.e. one magnet conductive panel 1442 has a N pole and another one has a S pole, the movement of the magnet assembly 144 will magnetically induce with the coil core 142 to change the line of the magnetic force of the coil core 142 so as to generate the induced current by the magnetic coil 147. The current generated by the magnetic coil 147 will guide to flow to the control panel 15 as a power supply thereof in order to ensure the control panel 15 to be powered to transmit the wireless control signal for controlling the electronic device. It is worth mentioning that the magnet assembly 144 is coupled at the first end of the switch panel 12 at a position that the magnet assembly 144 is supported within the panel cavity of the switch panel 12. In particular, the magnet assembly 144 is coupled at the inner wall of the panel cavity of the switch panel 12 to securely retain the magnet assembly 144 in position. Accordingly, the switch panel 12 further has two engaging arms 123 extended from two sides thereof and two engaging clips 124 integrally formed at two free ends of the engaging arms 123 respectively. The magnet assembly 144 is supported within the panel cavity of the switch panel 12 at a position between the two engaging arms 123, wherein the engaging clips 124 are detachably engaged with the outer supportive frame 1441, so as to prevent the magnet assembly 144 being detached from the switch panel 12 due to the movement of the magnet assembly 144.

Figure 10:
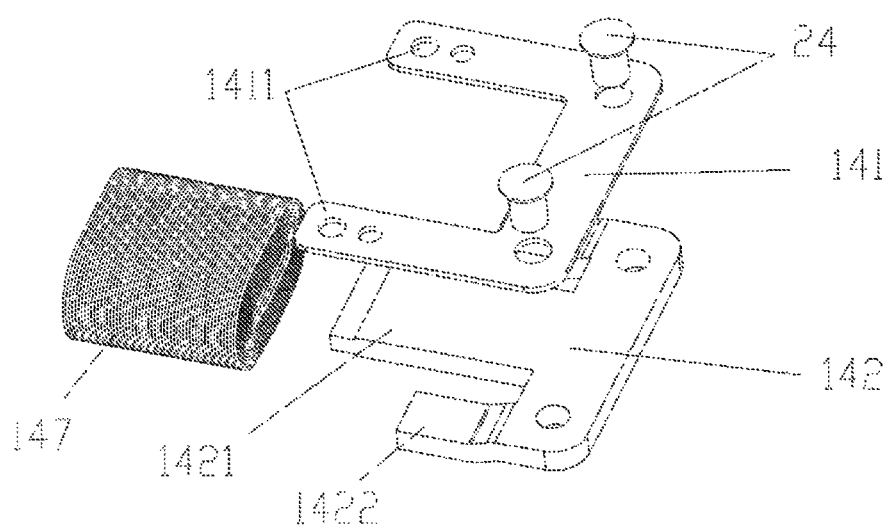
FIG. 10 is an exploded perspective view of the coil assembly of the self-powered wireless switch according to the above preferred embodiment of the present invention.

As shown in FIGS. 2 and 10, the coil assembly further comprises a resilient element 141, wherein one end of the resilient element 141 is affixed to the supporting panel 13 while another opposed end of the resilient element 141 is coupled to a second side of the coil core 142, such that the opposed first side of the coil core 142 faces toward the magnet assembly 144. Accordingly, the resilient element 141 having a U-shape is supported in a suspending manner, wherein a free end portion of the resilient element 141 is coupled with the second side of the coil core 142, such that the first side of the coil core 142 is suspendedly supported toward the magnet assembly 144. As shown in FIG. 7, when the magnet assembly 144 is moved downwardly, a magnetic attracting force between the magnet assembly 144 and the coil core 142 will generate to pull the coil core 142 downward so as to bend the resilient element 141 downward for restoring a resilient force thereof. When the magnet assembly 144 is kept moving downwardly, the resilient force of the resilient element 141 will transform as a reaction force to the coil core 142. When the reaction force of the resilient element 141 is greater than the magnetic attracting force, the resilient element 141 will rapidly bend upwardly to its original form to rapidly move the coil core 142 upward, so as to rapidly change the line of the magnetic force of the coil core 142. In other words, the magnetic coil 147 will generate a large amount of the induced current. Likewise, as shown in FIG. 8, when the magnet assembly 144 is moved upwardly, the magnetic attracting force between the magnet assembly 144 and the coil core 142 will generate to pull the coil core 142 upward so as to bend the resilient element 141 upward for restoring the resilient force thereof. When the magnet assembly 144 is kept moving upwardly, the resilient force of the resilient element 141 will transform as the reaction force to the coil core 142. When the reaction force of the resilient element 141 is greater than the magnetic attracting force, the resilient element 141 will rapidly bend downwardly to its original form to rapidly move the coil core 142 downward, so as to rapidly change the line of the magnetic force of the coil core 142. In other words, the magnetic coil 147 will generate a large amount of the induced current.

Accordingly, the magnet conductive panels 1442 are directly contacted with the coil core 142, wherein the magnet conductive panels 1442 are magnetically attracted to the coil core 142 when the magnet conductive panels 1442 are moved up and down. In other words, through the magnetic attraction, the coil core 142 is driven to move up and down corresponding to the movement of the magnet conductive panels 1442. Therefore, the resilient element 141 is bent correspondingly. Once the reaction force of the resilient element 141 is greater than the magnetic attracting force, the reaction force of the resilient element 141 will break the magnetic attraction between the magnet conductive panels 1442 and the coil core 142. Accordingly, the U-shaped resilient element 142 defines a mid-portion and forms a resilient platform to couple with the coil core 142, and two resilient arms extended from the mid-portion, such that when the resilient arms are bent, the mid-portion of the resilient element 142 can be rapidly rebounded to move the coil core 142 back to its original position, so as to prevent a distortion of the coil core 142.

As shown in FIGS. 2 and 10, the coil core 142, having a W-shape, comprises a mid core arm 1421 and two side core arms 1422, wherein the mid core arm 1421 is spacedly located between the two side core arms 1422. The coil wire is wound around the mid core arm 1421 to form the magnetic coil 147 and to define a protrusion portion of the coil core 142 at a free end of the mid core arm 1421. The coil core 142 is overlapped on the resilient element 141 at a position that the mid-portion of the resilient element 142 is affixed to a portion of the coil core 142 above the side core arms 1422. It is appreciated that the shape of the resilient element 141 can be modified as long as the resilient element will provide enough resilient force to the coil core 142 so as to ensure the coil core 142 to return back to its position in response to the movement of the magnet assembly 144. According to the preferred embodiment, the coil core 142 is overlapped on and affixed to the resilient element 141 via a rivet 24. It is appreciated that other fasteners can be used for affixing the coil core 142 to the resilient element 141. Accordingly, the resilient arms 1411 of the resilient element 141 are longer than the side core arms of the coil core 142, wherein the resilient arms 1411 of the resilient element 141 are affixed to two retention posts 145 integrally protruded from the supporting panel 13, such that the mid core arm 1421 of the coil core 142 is perpendicular to the magnet assembly 144. Accordingly, the magnetic coil 147 has at least 300 turns of coil wire. The induced voltage generated is proportional to the number of turns which the flux penetrates. Accordingly, every actuation of the switch panel 12 will cause the micro generator 14 to generate voltage. In each actuation of the switch panel 12, the generation time of the micro generator 14 is about 1.5 ms, the voltage generated by the micro generator 14 is about 9V-15V, and the current generated by the micro generator 14 is about 30 mA. It is worth mentioning that the number of turns of the magnetic coil 147, the size of the magnetic coil 147, and the strength of the magnetic field will be the factors to generate different voltage and current output.

Figure 11:
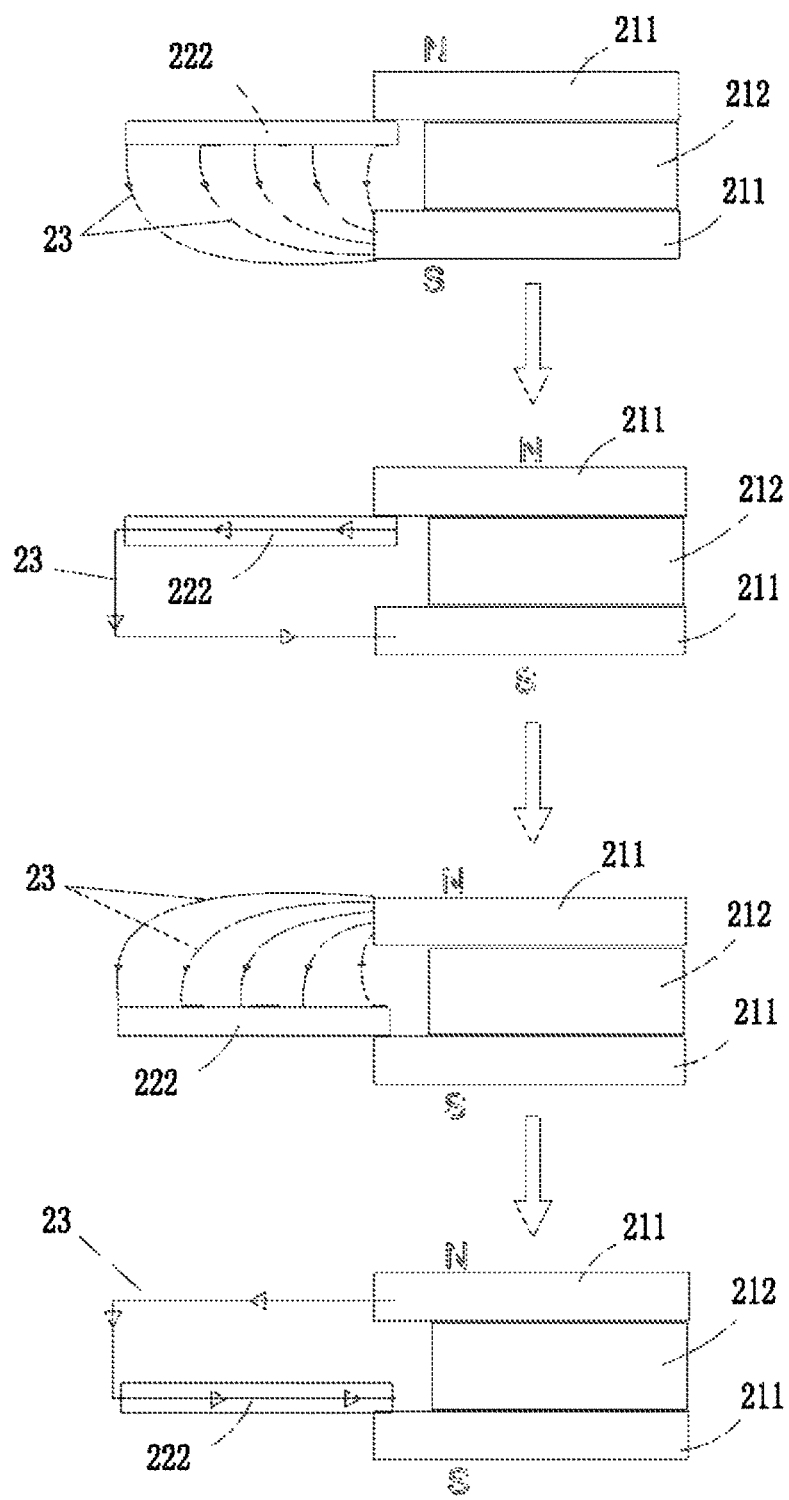
FIG. 11 illustrates the operation of the self-powered wireless switch to generate an induced current according to the above preferred embodiment of the present invention.

FIG. 11 illustrates an alternative mode of the magnet assembly which comprises a permanent magnet 212 and two magnet conductive panels 211 to sandwich the permanent magnet 212 therebetween, wherein the length of the permanent magnet 212 is shorter than the length of each of the magnet conductive panels 211, such that when the magnet conductive panels 211 are overlapped coupled at two sides of the permanent magnet 212 respectively, two extension portions of the magnet conductive panels 211 are extended out of the permanent magnet 212 to define a magnetic cavity between the extension portions. One side portion (right side portion) of the coil core 222 as the protrusion portion thereof is disposed within the magnetic cavity, wherein when the magnetic assembly is moved up-and-down, the protrusion portion of the coil core 222 can be moved within the magnetic cavity to contact with inner sides of the extension portions of the magnet conductive panels 211 in an alternating manner, so as to magnetize with the magnet conductive panels 211.

According to the preferred embodiment, during the movement of the magnet assembly 144 with respect to the coil assembly, the magnet conductive panels 1442 are magnetically attracted to the coil core 142 when the coil core 142 is facing toward the magnet conductive panels 1442. It is appreciated that a gap can be formed between the magnet conductive panels 1442 and the coil core 142 as long as the coil core 142 is magnetized to generate the current.

As shown in FIG. 1, three micro generators 14 are spacedly supported on the supporting panel 13, wherein three switch panels 12 are pivotally coupled at the supporting panel 13 corresponding to the three micro generators 14 respectively. In particular, the three switch panels 12 are orderly coupled at the supporting panel 13 side-by-side to operate the three micro generators 14 respectively. In other words, the self-powered wireless switch 1 of the present invention provides a plurality of switch panels 12 in one switch unit, such that the switch panels 12 can be selectively actuated to operate the corresponding micro generators 14, so as to control different electronic devices. The number of micro generators 14 can be selectively configured according to need of the electronic devices. Two or more micro generators 14 can be electrically linked to one control panel 15 via different circuits thereof. In other words, a number of diode rectifiers in the control panel 15 can be increased to form a power source partition of each micro generator 14, such that each switch panel 12 is actuated to individually operate the corresponding micro generator 14 so as to prevent the interference between the micro generators 14.

As shown in FIG. 1, the self-powered wireless switch 1 further comprises an outer frame 11 formed in a ring shape to couple at the peripheral portions of the supporting panel 12 and the switch panels 12. Therefore, the switch panels 12 can be securely coupled at the supporting panel 12 to protect the micro generators 14 and the control panel 15. In order to install the self-powered wireless switch 1, the outer frame 11 and the switch panel 12 can be detached from the supporting panel 12, such that the supporting panel 12 can be affixed on a wall surface via screws. Then, the outer frame 11 and the switch panel 12 can be mounted on the supporting panel 12 to complete the wall installation of the present invention. Preferably, the supporting panel 12 and the switch panel 12 are formed in rectangular shape, wherein the outer frame 11 is also formed in rectangular shape. It is appreciated that the supporting panel 12 and the switch panel 12 can be formed in other shape, wherein the shape of the outer frame 11 is also formed correspondingly.

It is worth mentioning that the switch panel 12 is an example to serve as an actuator to move the magnet assembly 144 up and down. Other actuators which can perform the same function can be used in the present invention. For example, the magnet assembly 144 can be directly moved manually. Since the micro generator 14 is the fundamental unit to be moved corresponding to the coil assembly, other actuators, including the switch panel 12, can be modified to achieve the same result of the magnet assembly 144.

Accordingly, the supporting panel 13 of the self-powered wireless switch 1 can be coupled on a wood surface, a glass surface, marble surface, or tile surface via an attaching means such as glue. As it is mentioned above, the supporting panel 13 can be affixed on any surface via the screws. Therefore, the installation of the present invention does not require any pre-formed groove on the wall to minimize the noise and to prevent any pollution during conventional installation process. The operation of the present invention is the same as the conventional wire-type switch through the actuation of the switch panel, such that the present invention is considered as an environmental friendly product for residual and commercial use.

Accordingly, the operational principle of the present invention is shown as follows:

The coil core 142 sleeved in the magnetic coil 147 provides two functions of magnetization and change of magnet flux. As shown in FIG. 7, assuming that the lower magnet conductive panel 1442 has a S pole and the upper magnet conductive panel 1442 has a N pole. Initially, the side of the coil core 142 is magnetically attracted to the lower magnet conductive panel 1442. Once the coil core 142 is magnetized, the S pole length of the lower magnet conductive panel 1442 will be further extended to the coil core 142. In other words, the magnetic field will penetrate through the magnetic coil 147 and the line of magnetic force will form as N-S, i.e. through the coil core 142 from point A to point B (enter from the left side of the coil core 142 and exit at the right side of the coil core 142). As shown in FIG. 8, when the switch panel 12 is pivotally actuated to drive the magnet assembly 144 to move downward, the relative displacement between the magnet assembly 144 and the coil core 142 is changed. The coil core 142 is moved from the lower magnet conductive panel 1442 to the upper magnet conductive panel 1442, such that the side of the coil core 142 is magnetically attracted to the upper magnet conductive panel 1442. At the same time, the coil core 142 is magnetized that the N pole length of the upper magnet conductive panel 1442 will be further extended to the coil core 142. As a result, the magnetic field will penetrate through the magnetic coil 147 and the line of magnetic force will form as N-S, i.e. through the coil core 142 from point B to point A (enter from the right side of the coil core 142 and exit at the left side of the coil core 142).

Figure 9:
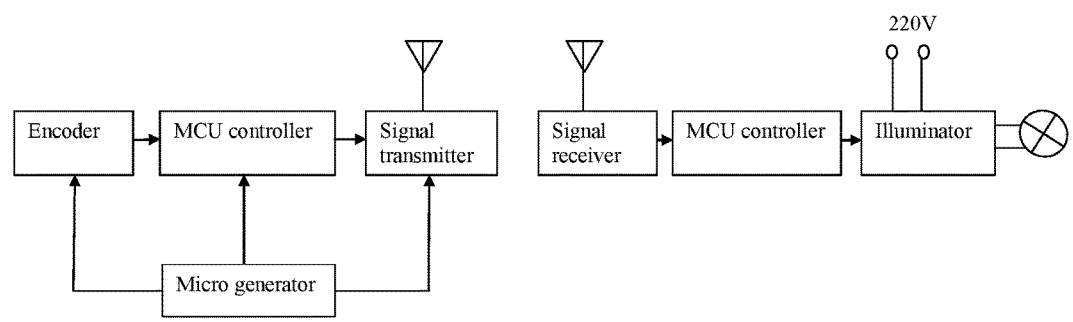
FIG. 9 is a block diagram of the self-powered wireless switch to the electronic device according to the above preferred embodiment of the present invention.

As shown in FIG. 11, the line of magnetic force is changed between the magnet assembly and the coil core 222 during the movement of the magnet assembly. As a result, the line of magnet force 23 (the magnetic induction line) of the coil core 222 is changed oppositely. According to the Faraday's Law of Induction, when the induced current is generated by the magnetic coil, the voltage is generated correspondingly. It is worth mentioning that the alternating current generated by the coil will be transformed into a direct current through a rectifier, such that the DC current will guide to flow to the control panel as the power source thereof. The control panel 15 comprises a diode rectifier and a wireless signal generator, wherein the wire from the micro generator, the diode rectifier and the wireless signal generator are electrically linked together in order. In other words, the AC current generated by the magnetic coil 147 is guided to pass to the diode rectifier. The positive-negative poles of the current generated by the magnetic coil 147 at one actuation of the switch panel 12 are opposite to that of the current generated by the magnetic coil 147 at the previous actuation of the switch panel 12. The diode rectifier will rectify the current from the magnetic coil 147 to ensure the proper current to pass to the wireless signal generator. Therefore, the wireless signal generator is powered up for generating the wireless control signal to control the desired electronic device. As shown in FIG. 9, the wireless control signal can be a coded control signal, such that when the electronic device receives the wireless control signal, a relay switch of the electronic device is activated to control the on-and-off of the electronic device.

As shown in FIG. 1, the switch panel 12 can be pivotally moved at two ends thereof to move the magnet assembly 144 up and down, so as to transform a mechanical energy into an electrical energy for supplying electrical power to the control panel. It forms the self-powered unit to generate the wireless control signal. The self-powered control switch 1 of the present invention is reliable comparing with the conventional wire-type control switch. It is safe to use because there is no power line electrically linked to the self-powered control switch 1 of the present invention. In addition, the self-powered control switch 1 of the present invention is a battery-less unit, such that no battery is required to be installed thereinto so as to minimize the operation cost of the self-powered control switch 1 of the present invention and to reduce the environmental pollution. It is worth mentioning that no electrical wiring is required for connecting the switch to the electronic device, such that the material cost, such as wires and PVC wire sleeves, can be significantly reduced. The installation process will also be simplified and shortened and the location of the control switch can be selectively adjusted. The user is able to switch on and off the electronic device through the actuation of the switch panel 12 as the actuation of the conventional switch.

Figure 12:
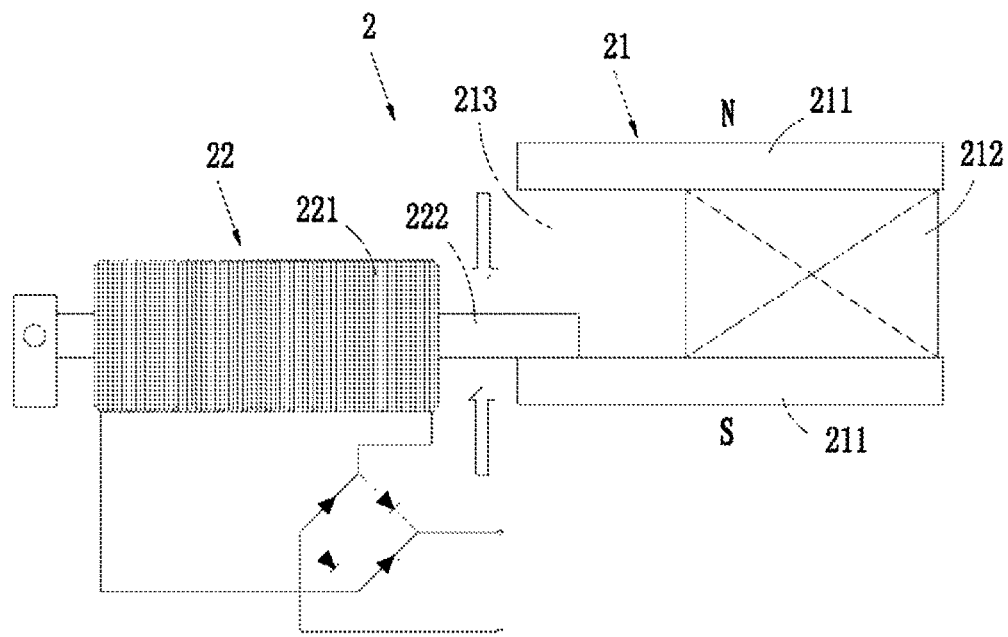
FIG. 12 illustrates the operation of the self-powered wireless switch to generate an induced current according to a second preferred embodiment of the present invention.
Figure 13:
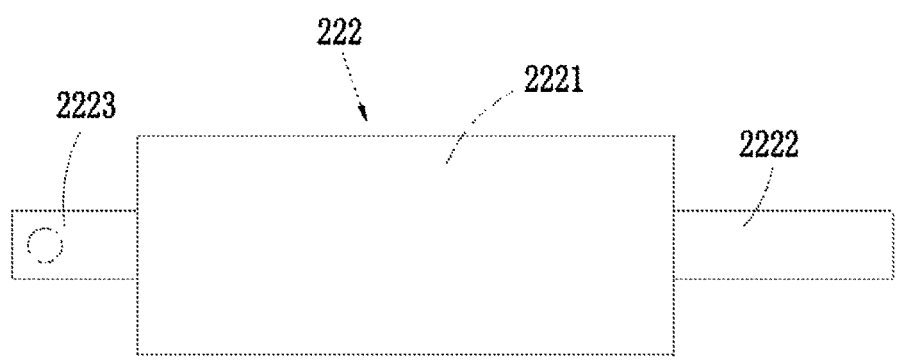
FIG. 13 is a side view of a coil core of the self-powered wireless switch according to the second preferred embodiment of the present invention.

As shown in FIGS. 12 and 13, a self-powered control switch 2 according to a second embodiment illustrates an alternative mode of the first embodiment of the present invention, wherein the structural configuration of the self-powered control switch 2 is the same as that of the first embodiment, except the following:

In the self-powered control switch 2, the magnetic assembly 21 is affixed to the supporting panel 13, wherein the magnetic assembly 21 is located at one side (right side) of the coil core 222 of the coil assembly 22. The magnet conductive panels 211 are overlapped coupled at two sides of the permanent magnet 212 respectively, wherein the length of the permanent magnet 212 is shorter than the length of each of the magnet conductive panels 211, such that two extension portions of the magnet conductive panels 211 are extended out of the permanent magnet 212 to define a magnetic cavity 213 between the extension portions. One side portion (right side portion) coil core 222 is disposed within the magnetic cavity 213. The coil core 222 has a mid core body 2221 where the wire coil 221 are wound therearound, a first core arm 2223 (left core arm), and a second core arm 2222 (right core arm), wherein the first and second core arms 2223, 2222 are oppositely and alignedly extended from the mid core body 2221. The first core arm 2223 is pivotally coupled at the supporting panel 13. The second core arm 2222 is extended within the magnetic cavity 213. The coil core 222 can be moved at the first core arm 2223 to contact the second core arm 2222 with the inner sides of the extension portions of the magnet conductive panels 211 in an alternating manner. The first core arm 2223 and the second core arm 2222 are integrally extended from the mid core body 2221 to form an integrated elongated body. It is appreciated that the mid core body 2221, the first core arm 2223, and the second core arm 2222 can be three individual components and coupled with each other.

Accordingly, the wire coil 221 of the coil core 222 is driven to move when the first core arm 2223 of the coil core 222 is rotated about a pivot point thereof. Therefore, when the second core arm 2222 of the coil core 222 is moved upward to contact with the inner side of the extension portion of the upper magnet conductive panel 211 and is then moved downward to contact with the inner side of the extension portion of the lower magnet conductive panel 211. As shown in FIG. 11, the line of magnet force 23 of the coil core 222 is changed, such that the coil 222 will generate the induced current as mentioned above.

According to the preferred embodiment, the present invention provides the following advantages:

(1) The structural configuration is simple and reliable.

(2) The micro generators are independently operated by the corresponding switch panel to simplify the overall structure for mass production.

(3) The service life span of the present invention is prolonged and the maintenance cost thereof is minimized.

(4) The present invention is a battery-less self-powered unit, such that the present invention does not require any battery replacement to minimize the pollution from the battery.

(5) The present invention does not require any wall wiring structure or wire protective sleeve to minimize the material cost related to the installation.

(6) The present invention can be operated without any moisture or explosion problem.

(7) The operation of the present invention is safer than that of the conventional wire type switch.

(8) The time for installation of the present invention can be significantly shortened to reduce the installation cost thereof.

(9) The present invention can be selectively installed at any surface and can be changed its location at any time. It is worth mentioning that no wire running groove is required for pre-forming in the wall.

(10) The operation of the present invention is the same as that of the conventional wire type switch via the switch panel.

(11) The present invention can be used to incorporate with any new electronic device or old electronic device as long as the electronic device can receive the wireless control signal from the present invention. Therefore, the invention is reliable, safe, and convenient with a remote switch, and can be widely used in everyday life.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A self-powered wireless switch, comprising:

a control panel for generating a wireless control signal;

a switch panel being actuated for generating a mechanical energy;

a micro generator, which is operatively coupled with said switch panel, comprising a magnet assembly and a coil assembly being moved in relation to each other for converting the mechanical energy from said switch panel to an electrical energy to said control panel, so as to power said control panel in a battery-less manner, wherein said coil assembly comprises a coil core and a coil wire wound around said coil core to form a magnetic coil, wherein a protrusion portion of said coil core is extended to magnetically induce with said magnet assembly to generate an induced current by said magnetic coil in response to the mechanical energy, wherein said magnet assembly comprises two magnet conductive panels and a permanent magnet sandwiched between said magnet conductive panels to define a magnetic cavity therebetween, wherein said protrusion portion of said coil core is extended within said magnetic cavity to magnetically induce with said magnet assembly, wherein said coil assembly further a resilient element coupled at said coil core for applying a resilient force thereto when said coil core is magnetically induced with said magnet assembly, wherein said magnet assembly is coupled at said switch panel to transfer the mechanical energy to said micro generator; and a supporting panel, wherein said coil assembly is supported on said supporting panel and said switch panel is pivotally coupled at said supporting panel, wherein said magnet assembly further comprises an outer supportive frame having an interior cavity that said permanent magnet and said magnet conductive panels are supported within said interior cavity of said outer supportive frame, wherein said magnet assembly further comprises two sliding panels symmetrically and spacedly extended from said supporting panel to form a sliding cavity between said sliding panels, wherein said outer supportive frame further has two sliding members extended from two sides thereof to slidably engage with said sliding grooves of said sliding panels respectively, such that said outer supportive frame is movable within said sliding cavity.

2. The self-powered wireless switch, as recited in claim 1, wherein said switch panel further has two engaging arms extended from two sides thereof and two engaging clips integrally formed at two free ends of said engaging arms respectively, wherein said magnet assembly is supported within a panel cavity of said switch panel at a position between said two engaging arms while said engaging clips are detachably engaged with said outer supportive frame.

3. The self-powered wireless switch, as recited in claim 2, wherein said switch panel further has two engaging arms extended from two sides thereof and two engaging clips integrally formed at two free ends of said engaging arms respectively, wherein said engaging clips are detachably engaged with said outer supportive frame.

4. A self-powered wireless switch, comprising:
 a control panel for generating a wireless control signal;
 a switch panel being actuated for generating a mechanical energy;
 a micro generator, which is operatively coupled with said switch panel, comprising a magnet assembly and a coil assembly being moved in relation to each other for converting the mechanical energy from said switch panel to an electrical energy to said control panel, so as to power said control panel in a battery-less manner, wherein said coil assembly comprises a coil core and a coil wire wound around said coil core to form a magnetic coil, wherein a protrusion portion of said coil core is extended to magnetically induce with said magnet assembly to generate an induced current by said magnetic coil in response to the mechanical energy, wherein said magnet assembly comprises two magnet conductive panels and a permanent magnet sandwiched between said magnet conductive panels to define a magnetic cavity therebetween, wherein said protrusion portion of said coil core is extended within said magnetic cavity to magnetically induce with said magnet assembly, wherein said coil assembly further a resilient element coupled at said coil core for applying a resilient force thereto when said coil core is magnetically induced with said magnet assembly, wherein said magnet assembly is coupled at said switch panel to transfer the mechanical energy to said micro generator; and
 a supporting panel, wherein said coil assembly is supported on said supporting panel and said switch panel is pivotally coupled at said supporting panel, wherein said coil core has a mid core body where said wire coil are wound therearound, a first core arm, and a second core arm, wherein said first and second core arms are oppositely and alignedly extended from said mid core body, wherein said first core arm is pivotally coupled at said supporting panel to enable a rotation of said coil core, wherein said second core arm is extended within said magnetic cavity, wherein said magnet assembly is affixed on said supporting panel.

5. The self-powered wireless switch, as recited in claim 4, wherein three said micro generators are supported at upper and lower portions of said supporting panel in an alternating manner, wherein three said switch panels are coupled to said micro generators respectively and are orderly coupled at said supporting panel side-by-side.

6. A self-powered wireless switch, comprising:
 a control panel for generating a wireless control signal;
 a switch panel being actuated for generating a mechanical energy;
 a micro generator, which is operatively coupled with said switch panel, comprising a magnet assembly and a coil assembly being moved in relation to each other for converting the mechanical energy from said switch panel to an electrical energy to said control panel, so as to power said control panel in a battery-less manner, wherein said magnet assembly is coupled at said switch panel to transfer the mechanical energy to said micro generator; and
 a supporting panel, wherein said coil assembly is supported on said supporting panel and said switch panel is pivotally coupled at said supporting panel, wherein three said micro generators are supported at upper and lower portions of said supporting panel in an alternating manner, wherein three said switch panels are coupled to said micro generators respectively and are orderly coupled at said supporting panel side-by-side.

* * * * *